(12) United States Patent
Baweja et al.

(10) Patent No.: US 6,332,189 B1
(45) Date of Patent: Dec. 18, 2001

(54) BRANCH PREDICTION ARCHITECTURE

(75) Inventors: Gunjeet Baweja, Sunnyvale; Harsh Kumar, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/174,150

(22) Filed: Oct. 16, 1998

(51) Int. Cl.[7] ..................................................... G06F 9/32
(52) U.S. Cl. ........................................... 712/238; 712/240
(58) Field of Search ................................... 712/205, 213, 712/214, 215, 219, 233, 234, 236, 237, 238, 239, 240, 23; 711/200

(56) References Cited

U.S. PATENT DOCUMENTS

| | | |
|---|---|---|
| 5,687,360 | 11/1997 | Chang . |
| 5,758,142 * | 5/1998 | McFarling et al. ................... 712/239 |
| 5,764,946 | 6/1998 | Tran et al. . |
| 5,978,907 * | 11/1999 | Tran et al. ............................ 712/239 |
| 5,987,599 * | 11/1999 | Poplingher et al. ................... 712/238 |
| 6,073,230 * | 6/2000 | Pickett et al. ......................... 712/205 |
| 6,079,003 * | 6/2000 | Witt et al. ............................. 711/200 |

OTHER PUBLICATIONS

S. McFarling, "Combining Branch Predictors," Technical Note TN–36, DEC–WRL, Jun. 1993.*
E. Rotenberg et al. "Trace Cache: a low latency approach to high bandwidth instruction fetching," Proceedings of the 29th International Symposium on Computer Architecture, Dec. 1996.*
Webster's II New Riverside Dictionary. Houghton Mifflin Company 1994; pp. 1–3.
McFarling, "Serial Branch Prediction," (Nov. 1996).
Su and Zhou, "A Comparative Analysis of Branch Prediction Schemes," (Undated).
Evers, Chang and Patt, "Using Hybrid Branch Predictors To Improve Branch Prediction Accuracy In The Presence Of Context Switches," (Undated).
Patel, Friendly and Patt, "Critical Issues Regarding The Trace Cache Fetch Mechanism," (Undated).
Yeh, Marr and Patt, "Increasing The Instruction Fetch Rate via Multiple Branch Prediction And A Branch Address Cache," (Jul. 1993).

* cited by examiner

*Primary Examiner*—Richard L. Ellis
(74) *Attorney, Agent, or Firm*—Blakely, Sokoloff, Taylor & Zafman LLP

(57) ABSTRACT

A branch prediction architecture is disclosed, having a branch predictor, a target address register, first and second multiplexors, a cache memory, and a trace cache. The branch predictor may advantageously be a series-parallel branch predictor, and alternatively may be a serial-BLG branch predictor or a choosing branch predictor. The first multiplexor receives an input from the target address register, and provides an output to the cache memory. The cache memory receives output from both the branch predictor and the first multiplexor, and provides an output to the second multiplexor. The trace cache receives the output from the branch predictor, and provides an output received by the second multiplexor. The second multiplexor, receiving input from both the trace cache and the cache memory, outputs branch predictions and instruction bundles.

27 Claims, 13 Drawing Sheets

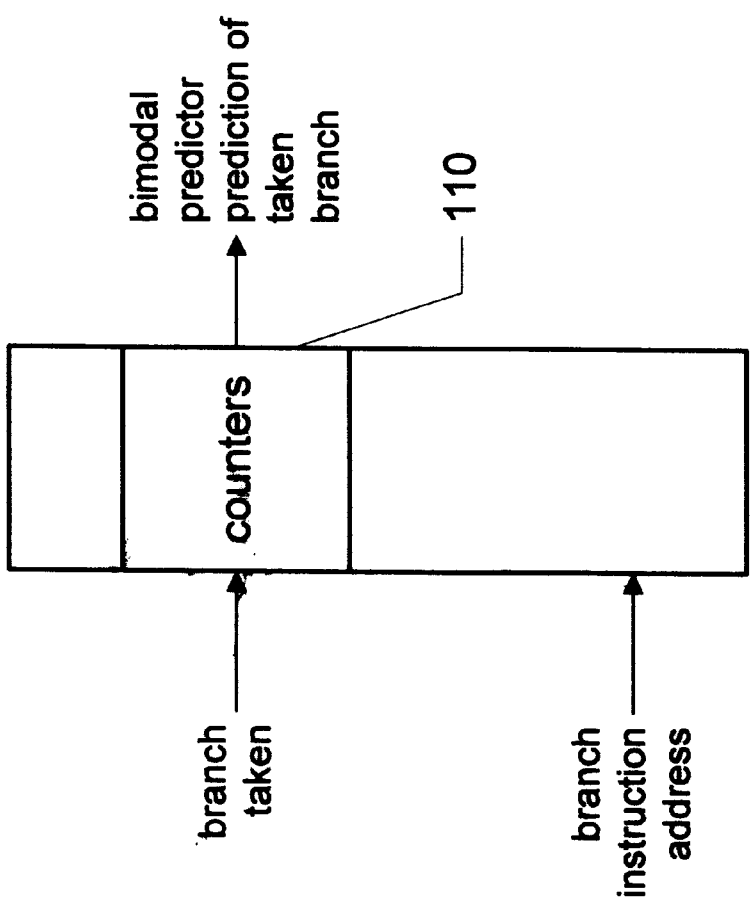
Fig. 1a *prior art*

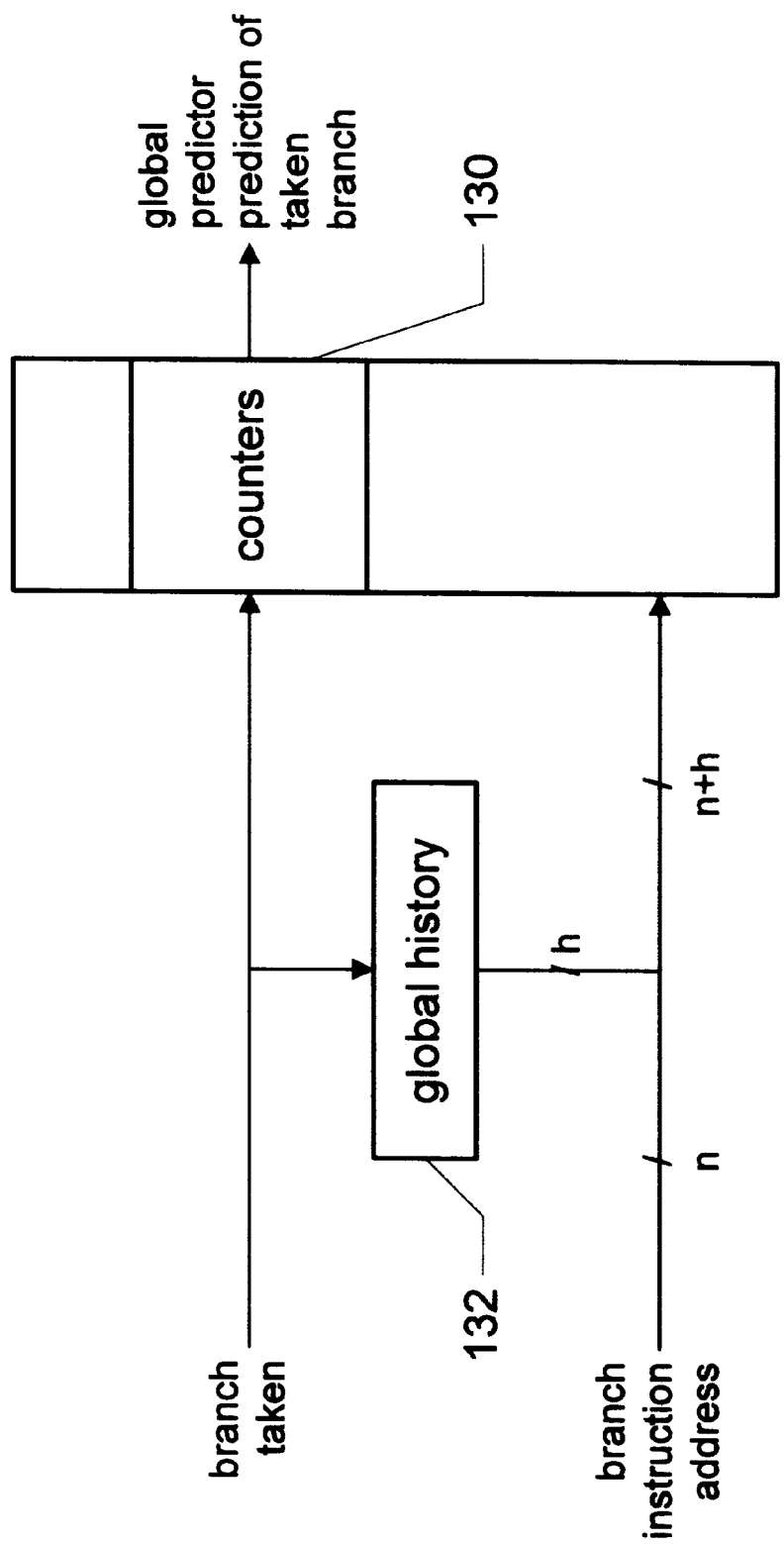
Fig. 1c *prior art*

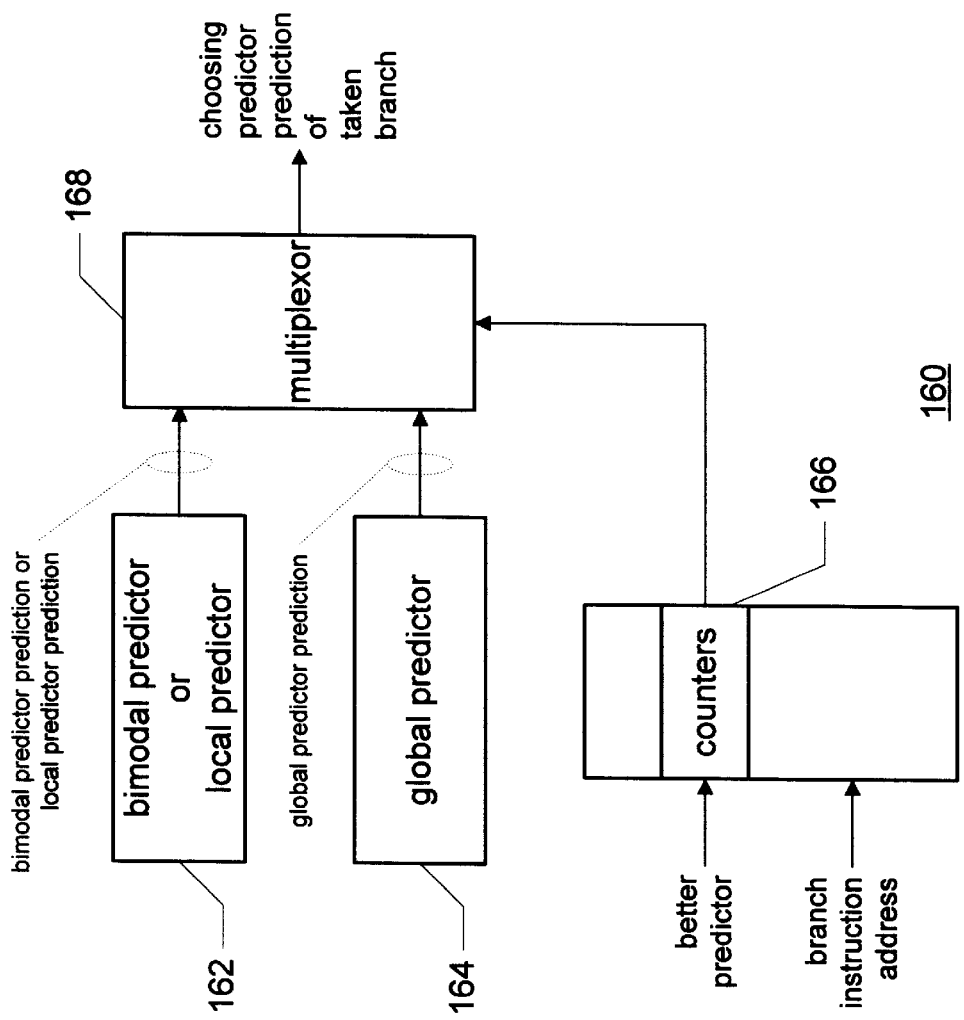
Fig. 1f *prior art*

BRANCH PREDICTION ARCHITECTURE

This invention is related to U.S. patent application Ser. No. 09/174,434 entitled "Apparatus and Method for Branch Prediction" by the inventors named herein, and filed on the same date as this application.

BACKGROUND OF THE INVENTION

1. Field of the Invention

This invention relates generally to computers. More particularly, the present invention relates to a branch prediction architecture.

2. Description of the Related Art

To maximize performance, modern computer designs attempt to execute as many instructions as possible concurrently. To find enough instructions to keep busy, the processors in modern computers use branch prediction to guess which instructions will be executed.

Branch prediction accuracy is a major performance factor in modern computer processor design. To improve branch prediction, various branch prediction strategies have been studied and implemented. See, for example, McFarling, "Serial Branch Prediction" (Nov. 1996); Su and Zhou, "A Comparative Analysis of Branch Prediction Schemes", Computer Science Division, University of California at Berkeley (undated); Evers, Chang, and Patt, "Using Hybrid Branch Predictors to Improve Branch Prediction Accuracy in the Presence of Context Switches", Department of Electrical Engineering and Computer Science, The University of Michigan (undated); Patel, Friendly, and Patt, "Critical Issues Regarding the Trace Cache Fetch Mechanism", Advanced Computer Architecture Laboratory, Department of Electrical Engineering and Computer Science, The University of Michigan (undated); and Yeh, Marr, and Patt, "Increasing the Instruction Fetch Rate via Multiple Branch Prediction and a Branch Address Cache", The 7th ACM International Conference on Supercomputing, Tokyo, Japan (July 1993). The sophisticated branch predictor implementations described in these papers use various different strategies, in various combinations, to achieve greater branch prediction accuracy.

The branch predictor is but one part, albeit an important part, of an overall branch prediction architecture. It is the overall branch prediction architecture's job to accurately and quickly guess which instructions will be executed, a job that becomes more and more complicated with each increase in computer speed, depth of pipeline, and number of instruction bundles. Although the known architectures are satisfactory for state-of-the-art microprocessors, they are not optimum for future processors that will be designed to process many more instructions concurrently, at much higher speeds.

The present invention is directed to overcoming, or at least reducing, these problems, and to provide a branch prediction architecture for future generation microprocessors.

SUMMARY OF THE INVENTION

According to one aspect of the present invention, provided is a branch prediction architecture having a branch predictor, a target address register, first and second selectors, and a memory. In operation, the first selector receives an output from the target address register, and provides an output to the memory. The memory receives an output from the branch predictor, as well as the output from the first selector, and in turn provides an output to the second selector. The second selector outputs branch predictions and instruction bundles.

According to another aspect of the present invention, a trace cache is included in the architecture. The trace cache receives the output from the branch predictor, and provides an output received by the second selector.

BRIEF DESCRIPTION OF THE DRAWINGS

Other objects and advantages of the invention will become apparent upon reading the following detailed description and upon reference to the drawings in which:

FIGS. 1a, 1b, 1c, 1d, 1e, 1f, and 1g, illustrate various prior art branch predictors, which may be used in the architecture of the present invention;

Figure 1B:
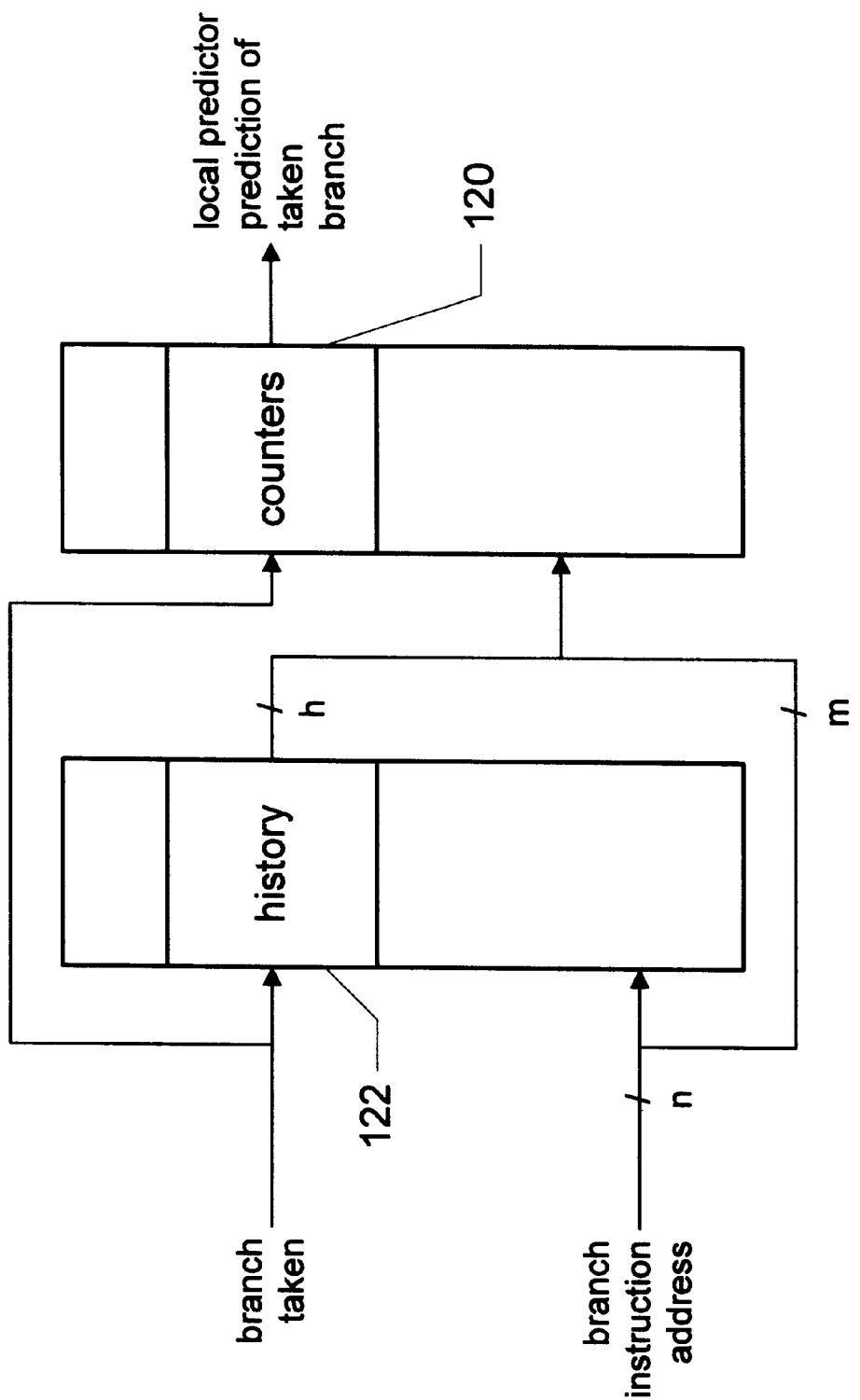

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intent is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in the specification. It will of course be appreciated that in the development of any such actual embodiment, numerous implementation-specific decisions must be made to achieve the developers specific goals, such as compliance with system-related and business-related strengths, which will vary from one implementation to another. Moreover, it will be appreciated that such a development effort might be complex, and time-consuming, but would never the less be a routine undertaking for those of ordinary skill in the art having the benefit of this disclosure.

The present invention permits branch predictions to be performed accurately and quickly, even in future-generation multi-bundle deep-pipelined machines operating at multiple gigahertz frequencies. While branch prediction accuracy is important, in future-generation microprocessors timing will become more important than it is in present state-of-the-art processors. Thus an important design question for future-generation processors is, what level of prediction accuracy can be achieved in a given time budget. The branch prediction architecture of the present invention will provide high accuracy, at very high speeds, in a four bundle machine.

In our above-referenced related patent application, entitled "Apparatus and Method for Branch Prediction", we claim and/or describe various branch predictors. Those branch predictors, especially the new series-parallel branch predictor taught in that patent application, can advantageously be used in the branch prediction architecture invention of this patent application. For a better understanding of the role of individual branch predictors in the present architecture invention, certain, but not all, of the teachings contained in the above-referenced patent application will be briefly discussed in this application. Nevertheless, the above-reference related application is incorporated herein by reference.

Known prior art branch predictors have, understandably, developed along a path of improved accuracy. That is, branch prediction strategies have become more and more sophisticated for the purpose of improving branch prediction accuracy. The resulting known prior art branch predictor designs have, in turn, become more and more sophisticated, and their branch prediction accuracy has become greater and greater. But these strategies and designs having timing requirements believed to be different from those needed for future-generation multi-bundle, super high speed machines.

We believe that the multi-bundle, super high speed machines of the future require a branch prediction scheme that will achieve acceptable prediction accuracy arrived at in a given time budget conducive to such super high speed operation. This can be achieved by using various branch predictor building blocks in the new series-parallel arrangement claimed and described in the above-referenced related patent application, in the architecture taught in this patent application. Before our new series-parallel branch predictor arrangement is briefly described, certain of the individual known building blocks which may be used in our new arrangement will briefly be described.

Referring now to the drawings, and in particular to FIGS. 1a–1g, illustrated are various known branch predictors. See, for example, the McFarling paper entitled "Serial Branch Prediction" referenced above.

FIG. 1a illustrates a bimodal branch predictor, having an array of a 2-bit saturating counters 110. The counters are indexed by the low order bits of the branch instruction address. The address counter takes as input the direction the branch goes, where 1 represents a taken branch, and 0 represents a non-taken branch. When the branch is taken, the counter counts up; when the branch is not-taken, the counter counts down. The counter saturates, and never counts below 0 or above 3. The most significant bit of the counter is used as the branch prediction value. The counter normally predicts which ever branch direction is more frequent. The 2 bits keep the prediction going the same direction even if the branch goes the unlikely direction one time. If the branch goes the unlikely direction twice in a row, then the predicted direction will reverse. This allows the predictor to adapt relatively quickly to new programs or new phases of execution with different branches. Because a bimodal predictor needs only 2 bits per branch, its physical size is relatively small.

FIG. 1b illustrates a local branch predictor. The local predictor improves on the prediction accuracy of the bimodal prediction, by recognizing that many branches have patterns in their execution. Certain branches execute repetitive patterns which can be detected if the immediate history of the branch is known. So, in the local predictor, certain immediate history data is stored. The illustrated local predictor uses an array of 2-bit counters 120 to make the prediction. The counters are indexed not only by the low order branch instruction address bits (as in the bimodal predictor), but also by the recent history of the branch. The recent history is stored in an array 122, which contains shifted history values indexed by low order bits of the branch instruction address; after a branch is executed, the direction taken is shifted into the appropriate history entry, and the oldest history bit is shifted out and discarded. A local predictor generally is significantly larger in physical size than a bimodal predictor, due to its use of the stored history array.

FIG. 1c illustrates a global branch predictor. The global predictor improves the accuracy of the local predictor, by making use of the history of all recent branches. The global predictor is similar to the local predictor and uses an array of 2-bit counters 130, but also has a history register 132 global to all branches.

Figure 1D:
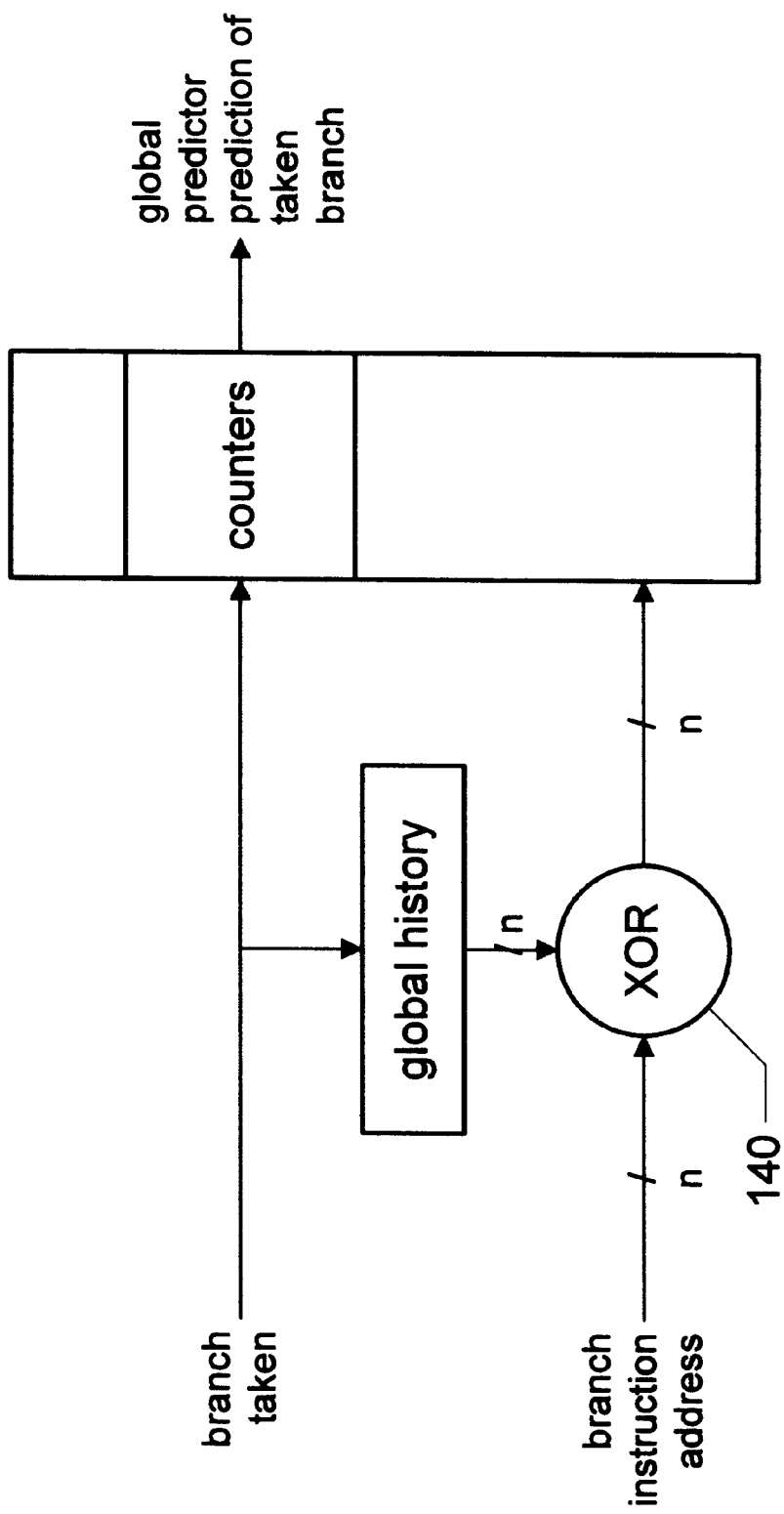
Figure 1E:
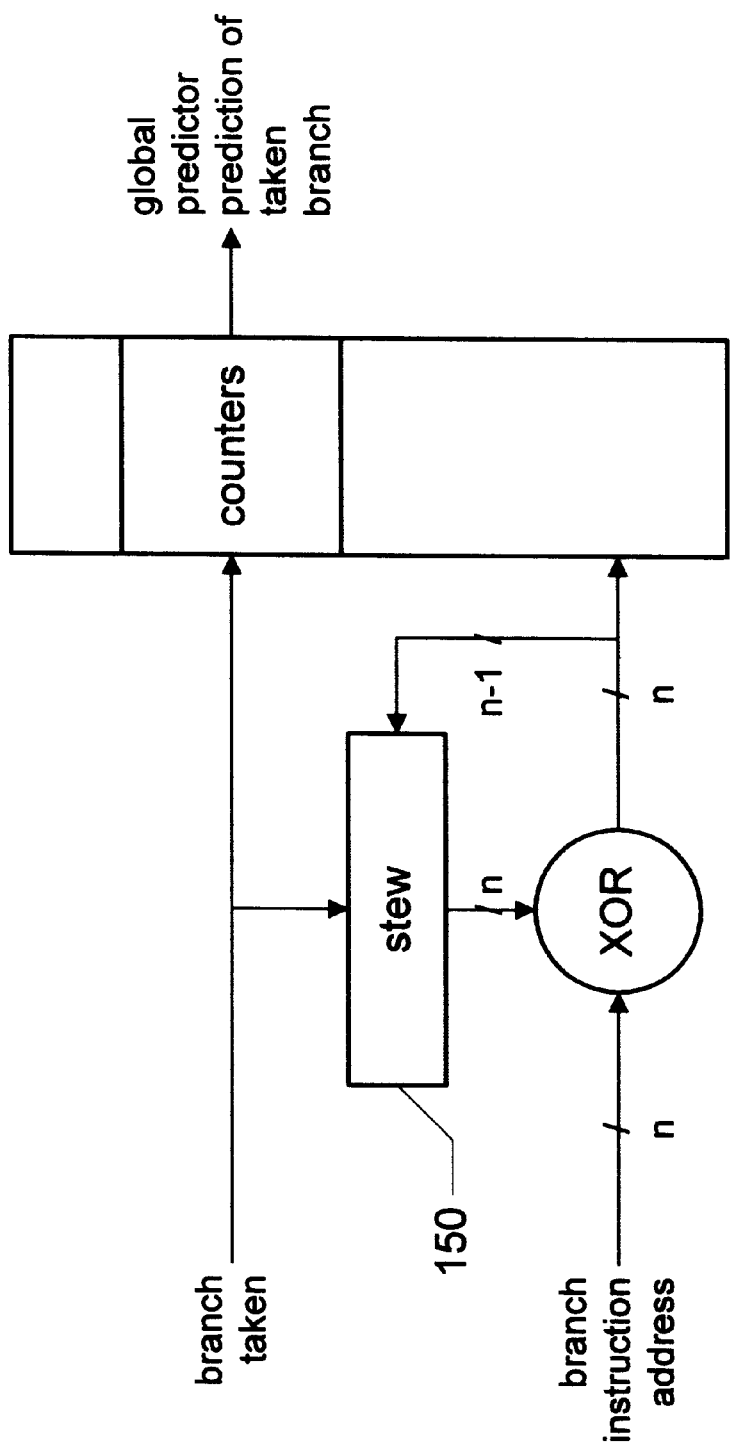

FIGS. 1d and 1e illustrate improved global branch predictors. Referring first to FIG. 1d, the global branch prediction accuracy can be improved somewhat by XORing the global history with the branch address, 140. Referring now to FIG. 1e, the global branch predication accuracy can be further improved by using what is sometimes called a "stew" register 150, which contains path information. This global predictor takes advantage of the observation that branches can be dependent on the path taken to reach them; accordingly, by saving data regarding the path, branch prediction accuracy can be improved.

The bimodal predictor, the local predictor, and the global predictor, are each building blocks that can be used to implement more sophisticated branch predictors.

Figure 1G:
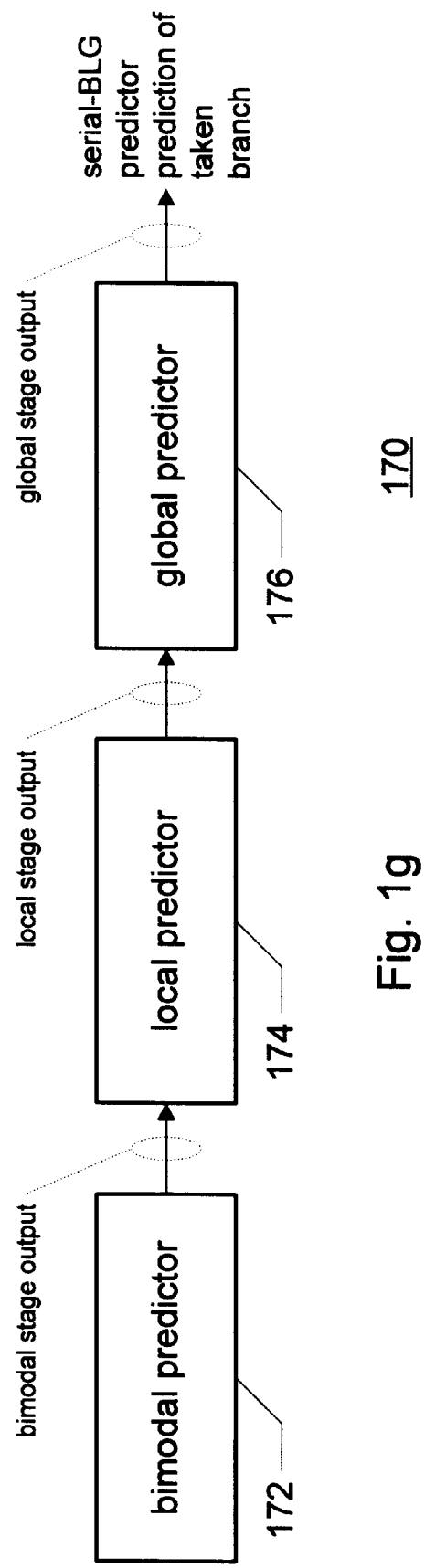

FIGS. 1f and 1g illustrate two known branch predictors using various of these building blocks in various combinations.

FIG. 1f illustrates a choosing predictor 160 having two predictor portions in parallel. The first portion 162 includes either a bimodal predictor or a local predictor. The second portion 164 includes a global predictor. Thus the choosing predictor 160 combines a global predictor with either a bimodal predictor or a local predictor. According to the art, a bimodal predictor works better at small sizes, and a local predictor works better at large sizes.

In addition to the two predictors, that is, the predictor in the first portion, and the global predictor in the second portion, the choosing predictor 160 also includes an array of 2-bit counters 166 that keep track of whether the first portion predictor or the second portion predictor performs better for each branch. Based on this count value, the better prediction is chosen by a multiplexor 168.

FIG. 1g illustrates a branch predictor 170, sometimes called a serial-BLG predictor, having a series combination of a bimodal predictor 172, a local predictor 174, and a global predictor 176. In the serial-BLG predictor embodiment illustrated, the fast adaptability of the first stage, the bimodal predictor stage 172, allows the serial-BLG predictor 170 to adapt quickly. The first stage covers the most common cases in a small physical size, allowing the second and third stages, 174 and 176, to be designed to handle only those cases where the first stage prediction is wrong.

Figure 2:
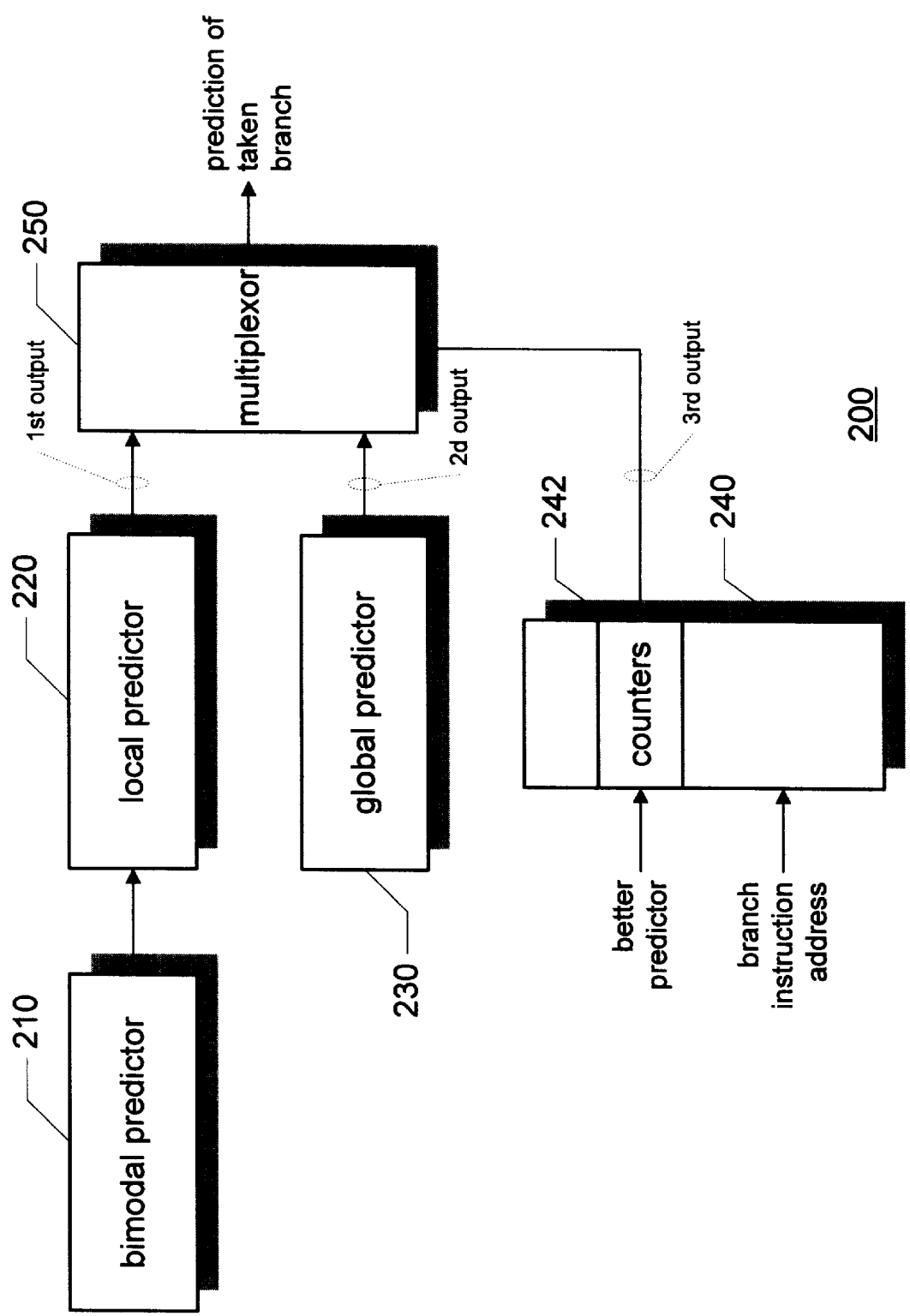
FIG. 2 illustrates a new series-parallel branch predictor which may be used in the present architecture.

Referring now to FIG. 2, illustrated is our series-parallel branch predictor 200, described and claimed in our above-referenced patent application. The branch predictor includes a bimodal predictor 210 in series with a local predictor 220. This series combination forms a first portion of the branch predictor 200, and has a first output, described more fully below. The bimodal predictor 210 may be similar to the bimodal predictor illustrated in FIG. 1a, but need not be; it need simply perform a bimodal prediction. Similarly, the local predictor 220 may be similar to that illustrated in FIG. 1b, but need not be; it need simply perform a local prediction.

With continued reference to FIG. 2, a global predictor 230 forms a second portion of our series-parallel branch predictor 200, and has a second output. The global predictor 230 may be similar to the global predictor illustrated in any of FIGS. 1c–1e, but need not be; it need simply perform a global prediction.

The embodiment of the series-parallel branch predictor illustrated in FIG. 2, further includes a portion 240 having an array of 2-bit counters 242. The portion 240 receives certain data regarding a branch instruction address. The data include a branch instruction address. It also includes information regarding which has been the better prediction in the past, that is, whether the second output of the global predictor 230, or the first output of the series combination of the bimodal predictor 210 and the local predictor 220 has, in the past, been the better prediction.

With continued reference to FIG. 2, included also is a multiplexor 250. The multiplexor 250 receives both the first and second outputs, and also a third output from the portion 240. With these outputs, the multiplexor 250 outputs a prediction of what the taken branch should be. This prediction is made by selecting either the first output or the second output, based upon the third output.

In the embodiment illustrated in FIG. 2, the first output is either the bimodal prediction of the bimodal predictor 210 or the local prediction of the local predictor 220. The local prediction is used when there is a "hit" in the local history table, and the bimodal prediction is used when there is not, as described more fully in our above-referenced related patent application. The second output is the global prediction of the global 230. The third output includes information regarding whether the first output or the second output has, in the past, been the better predictor. Using these inputs, the multiplexor 250 selects either the first output (which is either the local prediction or the bimodal prediction) or the second output (which is the global prediction) as the prediction of the taken branch.

As will be apparent to those skilled in the art having benefit of the present teachings and those contained in the above-referenced related patent application, any desired bimodal predictor structure may be used for the bimodal predictor 210, any desired local predictor structure may be used for the local predictor 220, and any desired global predictor structure may be used for the global predictor 230. Similarly, any desirable selecting structure may be used for the multiplexor 250.

Referring now to FIGS. 3–6, illustrated are various embodiments of a branch prediction architecture according to the present invention. Each illustrated embodiment includes a branch predictor 310. Advantageously, our new series-parallel branch predictor 200 may be used in the illustrated embodiments for the branch predictor 310 of FIGS. 3–6. FIG. 7 illustrates various alternatives. For example, if desired, either the serial-BLG branch predictor 170 or the choosing branch predictor 160 may be used instead of the series-parallel branch predictor 200. As yet another alternative, any other desired branch predictor, labeled 180 in FIG. 7, may be used, as desired, in the embodiments of the present architecture invention illustrated in FIGS. 3–6.

Figure 3:
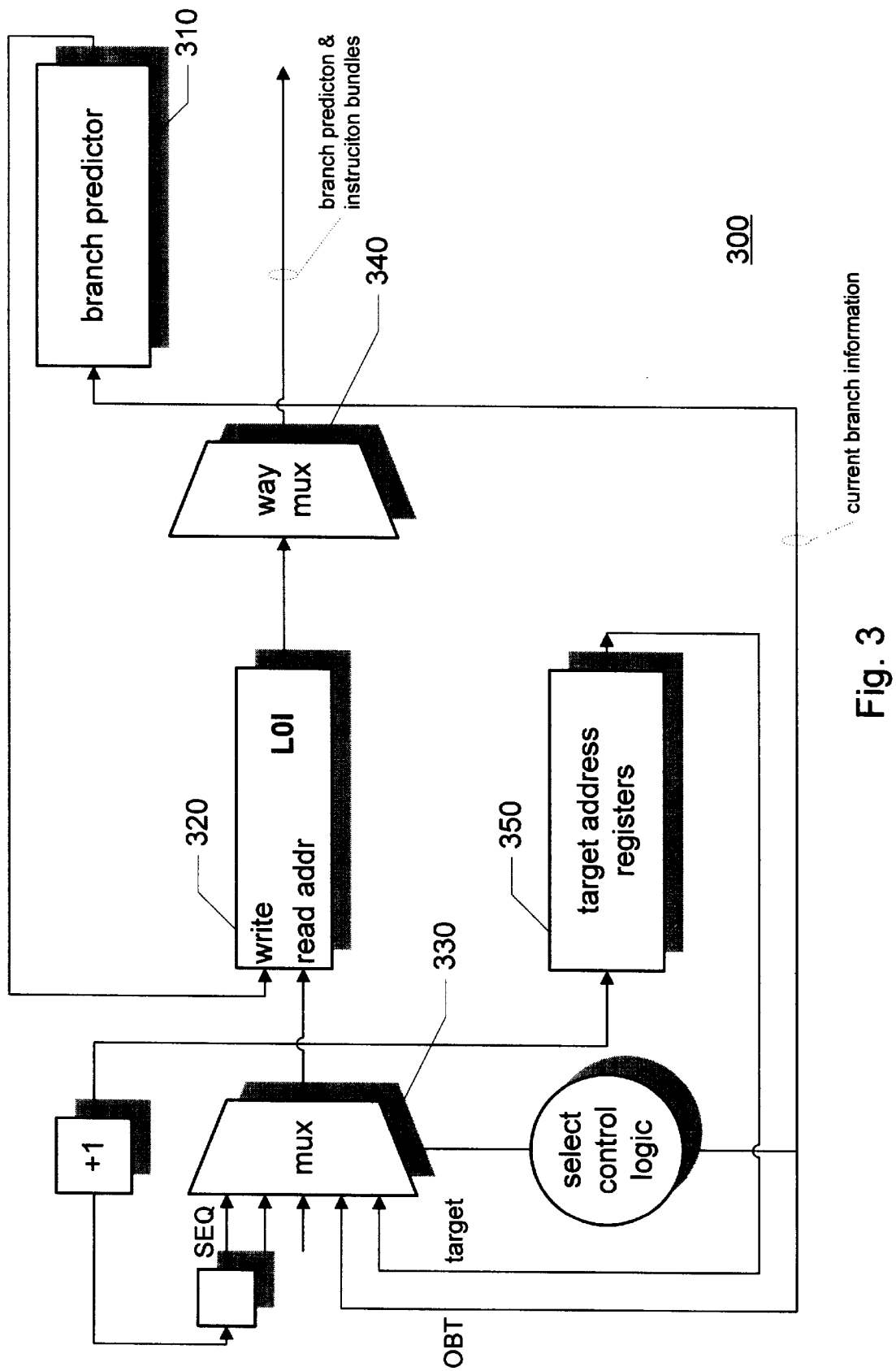
FIG. 3 illustrates a branch prediction architecture, according to a first exemplary embodiment of the invention.

Referring now to FIG. 3, the illustrated branch prediction architecture 300 includes the branch predictor 310, which receives current branch information and provides a branch predictor output to an L0I cache 320. In operation, the L0I cache contains branch prediction and branch history information. The cache 320 also receives input from a multiplexor 330, and provides an output to a multiplexor 340. The multiplexor 340, in turn, outputs branch prediction and instruction bundles. As will be apparent to those skilled in the art after having benefit of this disclosure, any suitable selector or selection device may be used for either of the multiplexors 330 and 340, and any suitable memory or memory device may be used for the cache 320.

With continued reference to FIG. 3, also included is a target address register 350, sometimes referred to as a TAR, which contains addresses for indirect branches. The target address register 350, in one embodiment, contains eight target address registers. The target address registers are provided to store the targets of branches that are mostly taken, and to turn around the taken instruction pointer within one clock cycle. The registers contained in the target address register 350 are looked-up using the output of an instruction pointer multiplexor; if there is a hit in one of the target address registers, the branch is predicted taken and the target address stored in the register is used to re-steer the front-end of the processor in the next clock cycle. In one advanced microprocessor, the compiler provides certain information to the hardware which highlights certain branches as likely taken or not taken. This information is used to allocate to the target address register. At the back-end of the microprocessor pipeline, it is verified whether the prediction was correct or not correct. On a target address register misprediction, the pipeline is re-steered.

The output of the target address register 350 is received by the multiplexor 330, which in turn provides a first selector output to the L0I cache 320.

Figure 4:
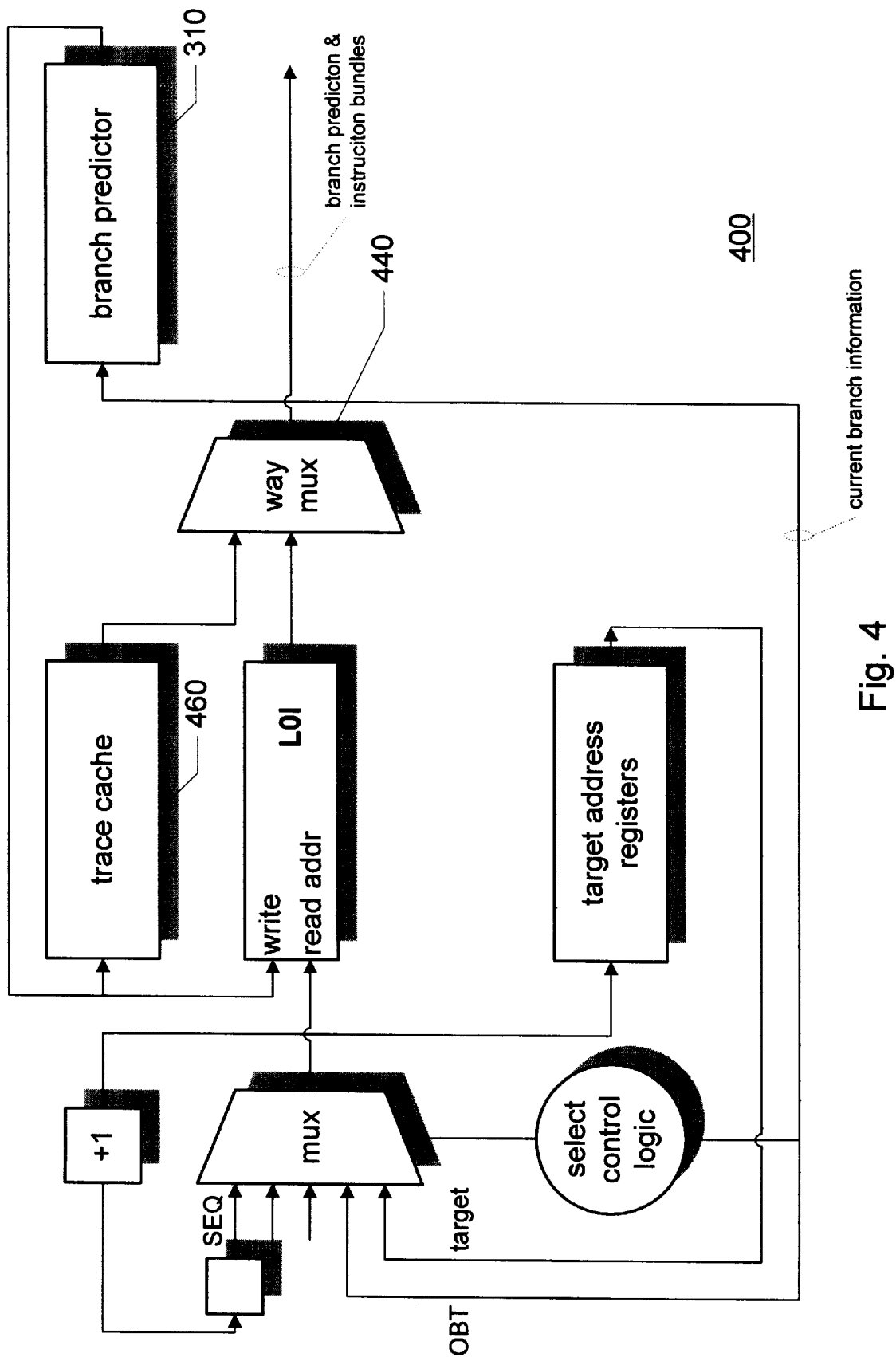
FIG. 4 illustrates a branch prediction architecture, according to a second exemplary embodiment of the invention.

The branch prediction architecture 400 illustrated in FIG. 4 includes a trace cache 460, which receives the branch predictor output from the branch predictor 310, and provides a trace output to a multiplexor 440.

The trace cache 460 supplies several blocks of memory by storing logically contiguous instructions in physically contiguous storage. Because future-generation machines, for example, a four-bundle machine, needs improved fetch bandwidth, the trace cache helps improve fetch accuracy. See, for example, the Patel et al. paper regarding trace caches referenced above.

Figure 5:
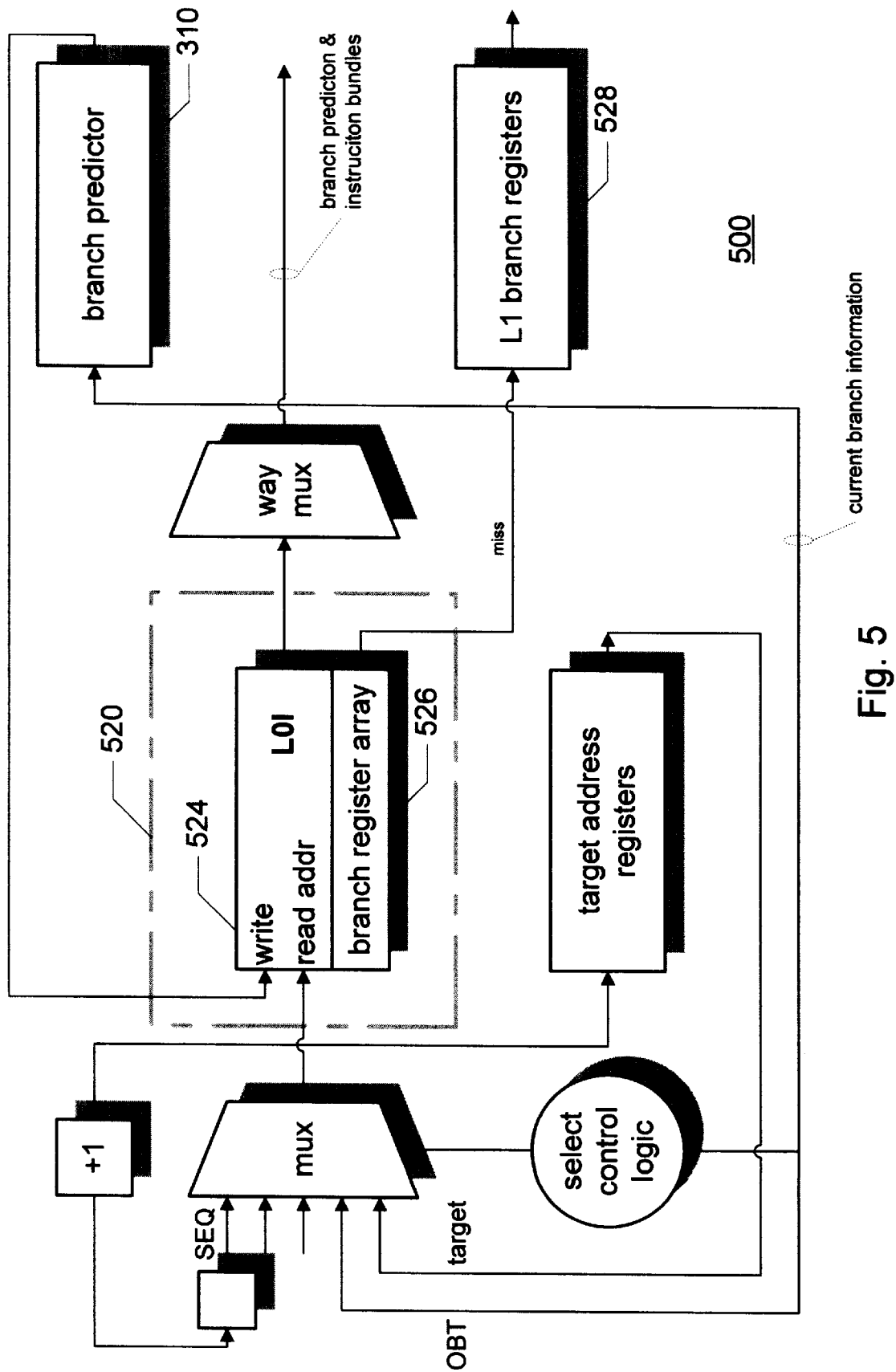
FIG. 5 illustrates a branch prediction architecture, according to a third exemplary embodiment of the invention.

FIG. 5 illustrates yet another embodiment of the present architecture invention. In this embodiment, branch prediction architecture 500 includes a first memory 520 having a separate cache 524 and a separate branch register array 526. In the embodiments illustrated in FIGS. 3 and 4, the branch history information and the caches were integrated in the L0I cache; in this embodiment the branch history information is contained in the branch register array 526, and the caches are contained in the cache memory 524.

Also included is a second level cache 528, which receives as its input a branch register output provided by the branch register array 526.

Figure 6:
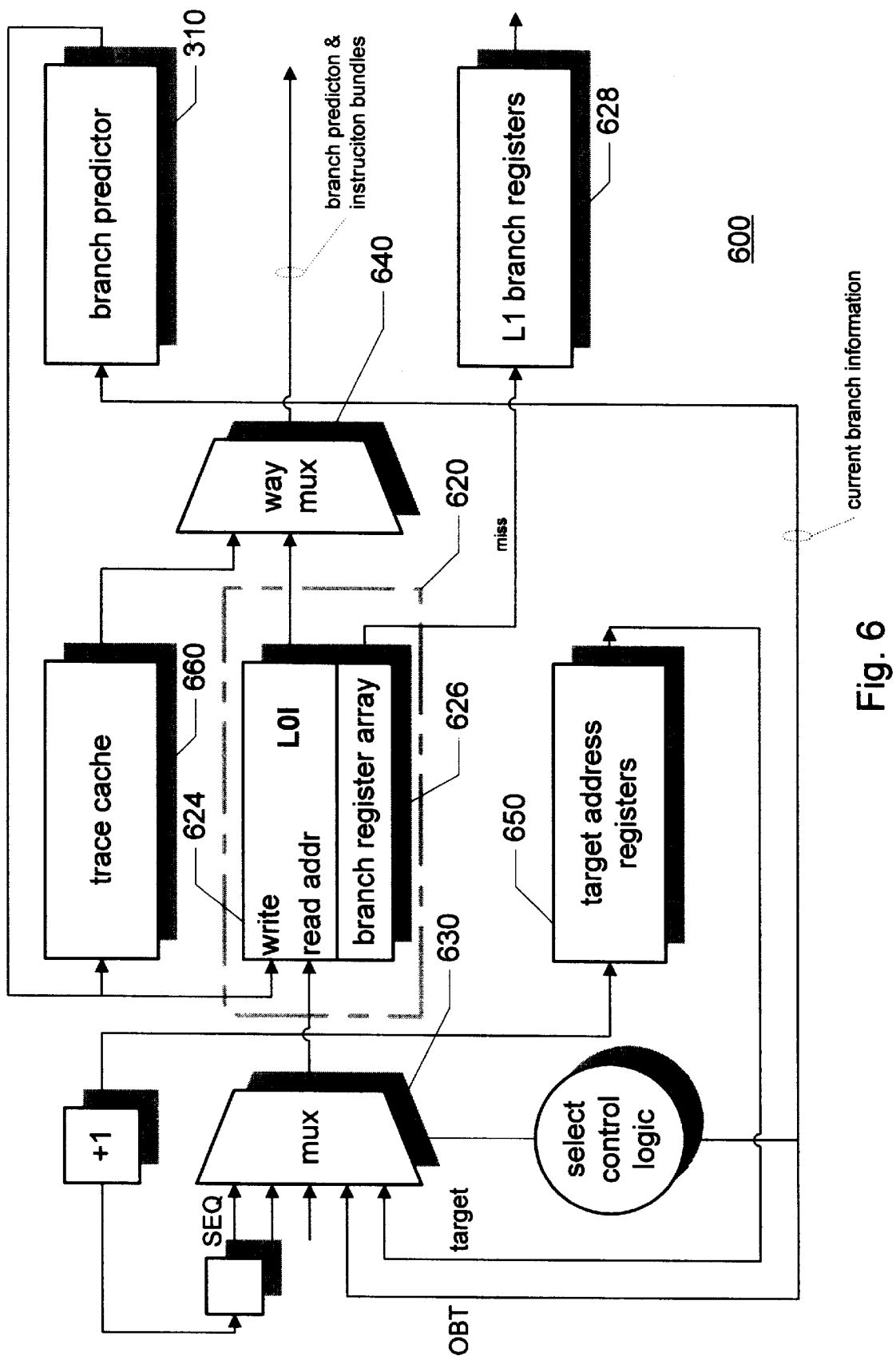
FIG. 6 illustrates a branch prediction architecture, according to one embodiment, that combines certain features of the first, second, and third embodiments shown in FIGS. 3–5.
Figure 7:
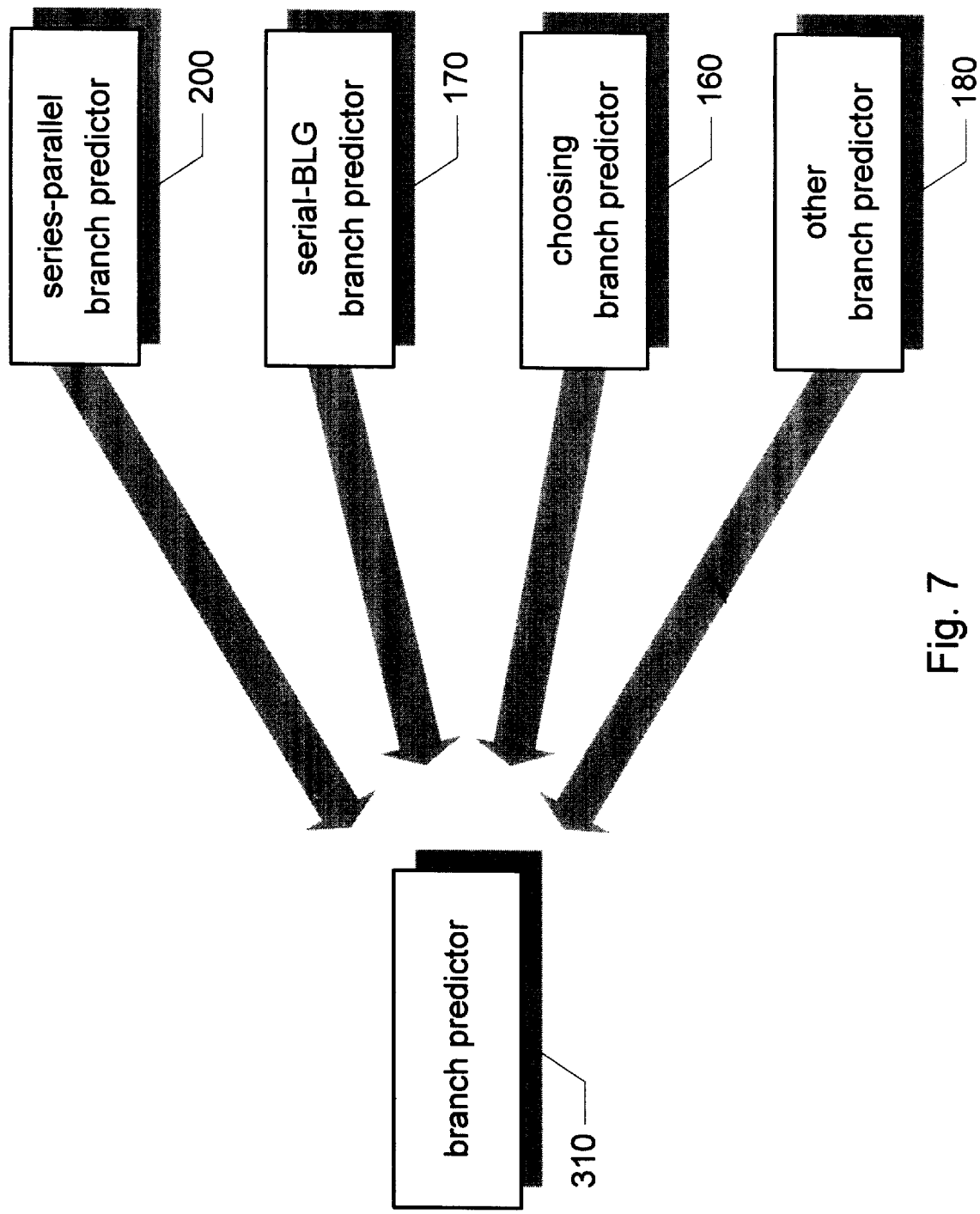
FIG. 7 illustrates various branch predictors which may be used as the branch predictor illustrated in the embodiments of FIGS. 3–6.

Referring now to FIG. 6, illustrated is a branch prediction architecture 600 having all of the features discussed in connection with the embodiments illustrated in FIGS. 3, 4, and 5. Advantageously, the architecture 600 includes the series-parallel branch predictor 200 as the predictor 310. As previously mentioned, however, the branch predictor 310 may be any of the branch predictors illustrated in FIG. 7. Additionally, the multiplexors 630 and 640 may be any suitable selector or selecting device or structure. The memories 624, 628, and 660 need not be caches, but may be any suitable memory or memory device. Similarly, the target address register 650 and the branch register array 626 may be any desired structure.

The particular embodiments disclosed above are illustrative only, as the invention may be modified and practiced in different but equivalent manners apparent to those skilled in the art having the benefit of the teachings herein. Furthermore, no limitations are intended to the details of construction herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A branch prediction architecture comprising:
    a branch predictor operable to provide a branch predictor output;
    a target address device operable to provide a target address output;
    a first selector operable to receive the target address output and to provide a first selector output;
    a first memory operable to receive the branch predictor output and the first selector output, and to provide a first memory output; and
    a second selector operable to receive the first memory output, and to provide a second selector output.

2. The branch prediction architecture of claim 1, wherein the branch predictor comprises a series-parallel branch predictor including:
    a first branch predictor portion having a bimodal branch predictor and a local branch predictor in series one with the other, and operable to provide a first output;
    a second branch predictor portion in parallel with the first branch predictor portion, having a global branch predictor, and operable to provide a second output;
    a first portion operable to receive data regarding a branch instruction address, and operable to provide a third output; and
    a second portion operable to receive the first, second, and third outputs, and to provide the branch predictor output.

3. The branch prediction architecture of claim 1, wherein the branch predictor comprises a serial-BLG branch predictor.

4. The branch prediction architecture of claim 3, wherein the serial-BLG branch predictor comprises:
    a bimodal branch predictor portion operable to provide a bimodal output;
    a local branch predictor portion in series with the bimodal branch predictor portion, and operable to provide a local output; and
    a global branch predictor portion in series with the local branch predictor portion, and operable to provide the branch predictor output.

5. The branch prediction architecture of claim 1, wherein the branch predictor comprises a choosing branch predictor.

6. The branch prediction architecture of claim 5, wherein the choosing branch predictor comprises:
    a first portion having either a bimodal branch predictor portion or local branch predictor portion, and operable to provide a first output;
    a global branch predictor portion in parallel with the first portion, and operable to provide a second output; and
    a branch predictor selector operable to receive the first output and the second output, and to provide the branch predictor output.

7. The branch prediction architecture of claim 1, wherein the target address device is a target address register.

8. The branch prediction architecture of claim 1, wherein the first selector and the second selector are each a multiplexor.

9. The branch prediction architecture of claim 1, wherein the first memory is a cache memory.

10. The branch prediction architecture of claim 1, wherein the first memory includes a branch register operable to provide a branch register output.

11. A branch prediction architecture comprising:
    a branch predictor operable to provide a branch predictor output;
    a target address device operable to provide a target address output;
    a first selector operable to receive the target address output and to provide a first selector output;
    a first memory operable to receive the branch predictor output and the first selector output, and to provide a first memory output, wherein the first memory includes a branch register operable to provide a branch register output;
    a second selector operable to receive the first memory output, and to provide a second selector output; and
    a second memory operable to receive the branch register output and to provide a second memory output.

12. The branch prediction architecture of claim 11, wherein the second memory is a cache memory.

13. The branch prediction architecture of claim 12, wherein the branch predictor comprises:
    a first branch predictor portion having a bimodal branch predictor and a local branch predictor in series one with the other, and operable to provide a first output;
    a second branch predictor portion in parallel with the first branch predictor portion, having a global branch predictor, and operable to provide a second output;
    a first portion operable to receive data regarding a branch instruction address, and operable to provide a third output; and
    a second portion operable to receive the first, second, and third outputs, and to provide the branch predictor output.

14. A branch prediction architecture comprising:
    a branch predictor operable to provide a branch predictor output;
    a trace memory operable to receive the branch predictor output and to provide a trace output;
    a target address device operable to provide a target address output;
    a first selector operable to receive the target address output and to provide a first selector output;
    a first memory operable to receive the branch predictor output and the first selector output, and to provide a first memory output; and
    a second selector operable to receive the trace output and the first memory output, and to provide a second selector output.

15. The branch prediction architecture of claim 14, wherein the branch predictor comprises a series-parallel branch predictor including:
    a first branch predictor portion having a bimodal branch predictor and a local branch predictor in series one with the other, and operable to provide a first output;

a second branch predictor portion in parallel with the first branch predictor portion, having a global branch predictor, and operable to provide a second output;

a first portion operable to receive data regarding a branch instruction address, and operable to provide a third output; and a second portion operable to receive the first, second, and third outputs, and to provide the branch predictor output.

16. The branch prediction architecture of claim 14, wherein the branch predictor comprises a serial-BLG branch predictor.

17. The branch prediction architecture of claim 16, wherein the serial-BLG branch predictor comprises:

a bimodal branch predictor portion operable to provide a bimodal output;

a local branch predictor portion in series with the bimodal branch predictor portion, and operable to provide a local output; and a global branch predictor portion in series with the local branch predictor portion, and operable to provide the branch predictor output.

18. The branch prediction architecture of claim 14, wherein the branch predictor comprises a choosing branch predictor.

19. The branch prediction architecture of claim 18, wherein the choosing branch predictor comprises:

a first portion having either a bimodal branch predictor portion or local branch predictor portion, and operable to provide a first output;

a global branch predictor portion in parallel with the first portion, and operable to provide a second output, and a branch predictor selector operable to receive the first output and the second output, and to provide the branch predictor output.

20. The branch prediction architecture of claim 14, wherein the target address device is a target address register.

21. The branch prediction architecture of claim 14, wherein the trace memory is a cache memory.

22. The branch prediction architecture of claim 14, wherein the first selector and the second selector are each a multiplexor.

23. The branch prediction architecture of claim 14, wherein the first memory is a cache memory.

24. The branch prediction architecture of claim 14, wherein the first memory includes a branch register operable to provide a branch register output.

25. A branch prediction architecture comprising:

a branch predictor operable to provide a branch predictor output;

a trace memory operable to receive the branch predictor output and to provide a trace output;

a target address device operable to provide a target address output;

a first selector operable to receive the target address output and to provide a first selector output;

a first memory operable to receive the branch predictor output and the first selector output, and to provide a first memory output, wherein the first memory includes a branch register operable to provide a branch register output;

a second selector operable to receive the trace output and the first memory output, and to provide a second selector output; and a second memory operable to receive the branch register output and to provide a second memory output.

26. The branch prediction architecture of claim 25, wherein the second memory is a cache memory.

27. The branch prediction architecture of claim 26, wherein the branch predictor comprises:

a first branch predictor portion having a bimodal branch predictor and a local branch predictor in series one with the other, and operable to provide a first output;

a second branch predictor portion in parallel with the first branch predictor portion, having a global branch predictor, and operable to provide a second output;

a first portion operable to receive data regarding a branch instruction address, and operable to provide a third output; and a second portion operable to receive the first, second, and third outputs, and to provide the branch predictor output.

* * * * *